United States Patent [19]

Schroll et al.

[11] Patent Number: 5,492,743
[45] Date of Patent: * Feb. 20, 1996

[54] PULTRUDED MEMBER WITH FUNCTIONAL FEATURES

[75] Inventors: Ross E. Schroll, Fairport; Joseph A. Swift, Ontario; Peter A. Sardano, Fairport, all of N.Y.

[73] Assignee: Xerox Corporation, Stamford, Conn.

[*] Notice: The portion of the term of this patent subsequent to Nov. 24, 2011, has been disclaimed.

[21] Appl. No.: 994,224

[22] Filed: Dec. 21, 1992

[51] Int. Cl.$^6$ ................................................ B29D 22/00
[52] U.S. Cl. ................................. 428/36.9; 428/36.1
[58] Field of Search .................... 428/36.1, 36.9; 156/166, 180, 433; 264/171, 174

[56] References Cited

U.S. PATENT DOCUMENTS

| | | | |
|---|---|---|---|
| 2,751,320 | 6/1956 | Jacobs et al. | 154/91 |
| 3,336,426 | 8/1967 | Boggs | 264/137 |
| 4,012,267 | 3/1977 | Klein | 156/178 |
| 4,300,321 | 11/1981 | Preis et al. | 52/223 |

FOREIGN PATENT DOCUMENTS

| | | |
|---|---|---|
| 0017010 | 5/1980 | European Pat. Off. . |
| 0325804 | 2/1989 | European Pat. Off. . |
| 2317097 | 4/1977 | France . |
| 2558102 | 7/1985 | France . |

*Primary Examiner*—Christopher W. Raimund
*Attorney, Agent, or Firm*—Samuel E. Mott; Zosan S. Soong

[57] ABSTRACT

A pultruded composite member having a longitudinal axis comprising a plurality of reinforcing fibers in a solid polymer matrix, said member having embedded at least one functional feature having been incorporated therein during its manufacture when the fiber reinforced liquid polymer was pulled through a pultrusion apparatus.

10 Claims, 6 Drawing Sheets

PULTRUDED MEMBER WITH FUNCTIONAL FEATURES

CROSS REFERENCE TO RELATED APPLICATION

Attention is directed to our application Ser. No. 07/993,845, now issued as U.S. Pat. No. 5,366,773 filed concurrently herewith entitled "Tubular Pultruded Member Having Uniform Wall Thickness" which is commonly assigned to the assignee of the present invention.

BACKGROUND OF THE PRESENT INVENTION

The present invention relates generally to pultruded members and in particular to pultruded members having functional features incorporated therein as well as methods of making such pultruded members.

The pultrusion process generally consists of pulling continuous lines of fibers through a resin bath or impregnator and then into a preforming fixture where the section is partially shaped and excess resin and/or air are removed and then into heated dies where the section is cured continuously. Typically, the process is used to make fiber glass reinforced pultruded shapes. For a detailed discussion of pultrusion technology, reference is directed to "Handbook of Pultrusion Technology" by Raymond W. Meyer, first published 1985 by Chapman & Hall, New York which is hereby incorporated by reference in its entirety herein. In the pultrusion process the fibers are submersed in a polymer bath and drawn through a die opening of suitable shape and high temperature to produce a solid piece of dimensions and shapes of the die which can be cut, shaped and machined.

Typically, the formation of functional features perpendicular to the pultrusion process direction such as holes, hole patterns, slots, ridges, grooves, contact areas, inserts, threaded inserts, screw threads or other shapes and features are formed in the pultruded composite member by a secondary operation which while it may involve conventional machining techniques adds additional cost and process time.

The pultrusion process may be modified such that when the pultrusion is initially removed from the die it is pliable and can be bent or otherwise shaped to a form which upon further curing becomes a rigid structural member. Further, if the resin is a thermoplastic the process can be adjusted such that the part is removed hot from the die, shaped and then cooled to solidify or subsequently heated, formed and then cooled.

In making tubular or hollow pultruded members a mandrel is installed to span from ahead of the polymer bath through the forming die section in the heated die and often totally through the heated die itself. The internal hole feature of the tubular pultruded member is created by a cantilevered mandrel of the desired internal shape supported only at the rear portion of the pultrusion machine. As a result, the cantilevered mandrel floats relative to the heated die and due to its length and weight which is unsupported provides variations in wall thickness of the final pultruded member. In addition, since the rovings and mat reinforcement used in the pultrusion manufacturing process may in themselves vary by up to ±15% in thickness a further thickness variable in the final pultruded member can be created. Accordingly, the tolerances in the pultrusion process are much greater than those from injection molding processes and are typically of the order of ±20% on wall thicknesses for major dimension less than two inches. By comparison, injection molding parts may have a ±2%, or even ±0.5% tolerance in thickness. As a result it is difficult if not impossible to use together or interchangeably structural tubular parts made from both an injection molding process and a pultrusion process.

One technique that has previously been used to minimize these difficulties in obtaining uniform wall thickness is to have the pultrusion process run as a vertical process wherein the mandrel is centered more by gravity within the center of the heated die. However, this is a very expensive process, particularly in that it requires an extremely tall building to accommodate the larger pultruded members.

SUMMARY OF THE INVENTION

The present invention is directed to a process for producing, both solid and tubular, pultruded members having functional features incorporated therein.

The present invention is also directed to providing solid spacers in the walls of tubular pultruded member that have the dimensions of the walls to control the wall thickness.

In a principle aspect of the present invention the pultruded composite member is formed by simultaneously pulling continuous reinforcing fibers and at least one carrier tape with at least one functional feature thereon through a liquid polymer bath and into and through the heated die to shape and cure the liquid polymer into the pultruded member.

In a further aspect of the present invention there typically are a plurality of functional features such as holes, hole patterns, slots, ridges, grooves, contact areas, inserts, threaded inserts, screw threads or other shapes and features capable of performing at least one function such as that of being a mounting, for example, of a component like a threaded hole fastener.

In a further principle aspect of the present invention the functional features such as a rib, which may be continuous or discontinuous, are formed perpendicular to the pultrusion process direction.

In a further principle aspect of the present invention a second carrier tape is provided with plugs thereon which are positioned and shaped to correspond to the holes in the hole fasteners and inserted therein and the process includes the step of stripping the second carrier tape with said plugs from the pultruded member after it is removed from the heated die.

In a further principle aspect of the present invention a tubular pultruded member is provided which in addition to having at least one functional feature therein has a substantially uniform wall thickness formed by simultaneously pulling continuous reinforcing fibers and at least one carrier tape with wall spacers thereon through a liquid polymer bath around a mandrel and into and through the heated die to shape and cure the liquid polymer into the tubular pultruded member. The wall spacers having a thickness equal to the uniform distance between the outside surface of the mandrel and the inside surface of the die.

In a further aspect of the present invention the wall spacers are used to control the wall thickness of the tubular pultruded member and are oriented in the polymer matrix in a direction substantially parallel to the longitudinal axis of the pultruded member.

In a further aspect of the present invention the tubular pultruded member has a substantially circular cross section with a substantially uniform wall thickness.

In a further aspect of the present invention the wall spacers are uniformly spaced apart in the direction of the longitudinal axis of the pultruded member and are on or in a carrier tape.

In a further aspect of the present invention a functional feature such as a hole, insert or threaded insert also functions as a wall spacer.

BRIEF DESCRIPTION OF THE DRAWINGS

The invention is illustrated with reference to the following representative figures in which the dimensions of parts are not necessarily to scale but rather may be exaggerated or distorted for clarity of illustration and ease of description.

DETAILED DESCRIPTION OF THE PREFERRED EMBODIMENTS

In accordance with the present invention a pultruded member and method of making same are provided wherein the pultruded member has embedded in it's surface at least one functional feature which has been incorporated therein during it's manufacture when the fiber reinforced liquid polymer was pulled through a pultrusion apparatus. Typically, there are a plurality of functional features embedded in the surface of the pultruded member which are provided on a carrier tape which is pulled through the pultrusion apparatus along with the reinforcing fibers and liquid polymer during the pultrusion process of making a pultruded member. Typically, the embedded functional features include the formation of functional features perpendicular and/or parallel to the pultrusion process direction and are representative of hole inserts, hole patterns, slots, ridges, grooves, ribs, contact areas, inserts, threaded inserts, screw threads and other shapes and features, which may be formed during the process. Accordingly, the term functional feature is intended to define broadly any feature which may perform a function, whether it be functionally operative, such as a threaded hole insert or functionally or nonfunctionally decorative such as a uniquely shaped raised rib or depressions perpendicular to the process direction.

In accordance with a further aspect of the present invention a tubular pultruded member having at least one functional feature embedded therein and method of making same, are provided wherein the tubular pultruded member has a substantially uniform wall thickness throughout provided by a series of wall spacers embedded in the tubular pultruded member having a thickness equal to the uniform distance between the outside surface of the mandrel and the inside surface of the die. By the term "uniform distance" it is intended to define the distance between the outside surface of the mandrel and the inside surface of the die if the mandrel and the die were precisely positioned relative to each other so that the distance therebetween along any longitudinal axis would be substantially uniform. Accordingly, it defines for example, a tubular pultruded member having a square cross section wherein each of the four sides have substantially the same wall thickness in cross section and also along each of the four longitudinal axes of the pultruded member. It also means that a similar tubular pultruded member may have two parallel sides, for example, having the same uniform wall thickness and two perpendicular sides having the same uniform, but different wall thicknesses. Similarly, it includes a substantially circular tubular pultruded member wherein the wall thickness through a cross section as well as along any longitudinal axis is substantially uniform.

Figure 1:
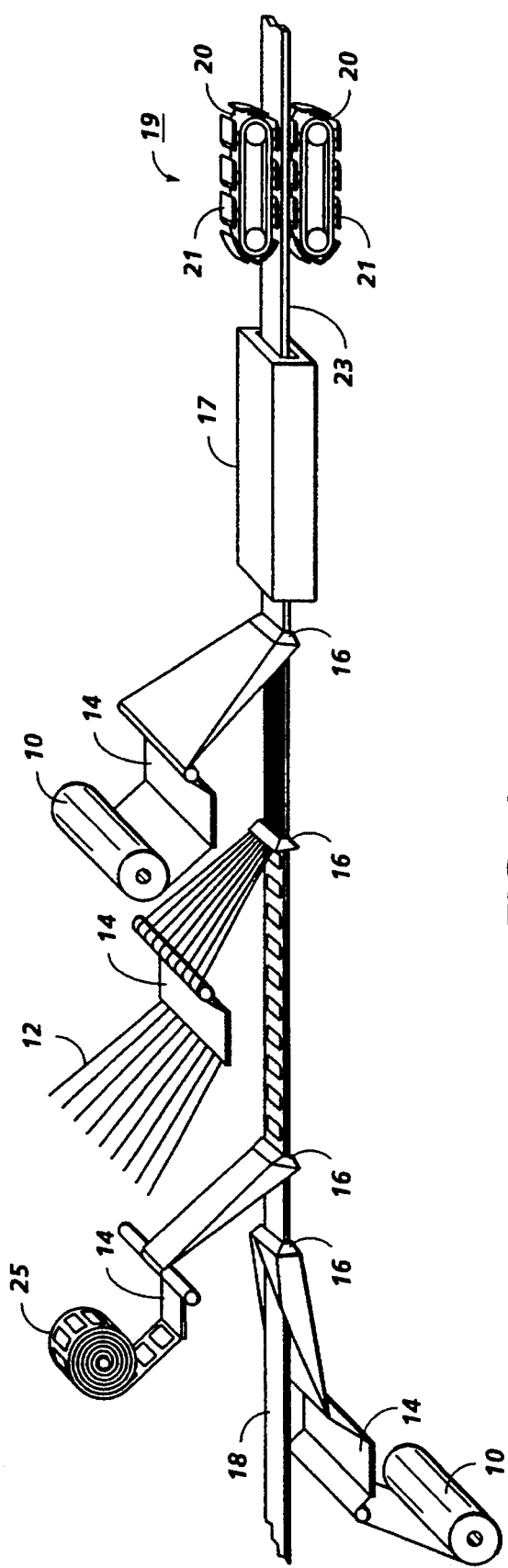
FIG. 1 is an isometric representation of a typical pultrusion apparatus and process to produce a tubular pultruded member according to the present invention.
Figure 2:
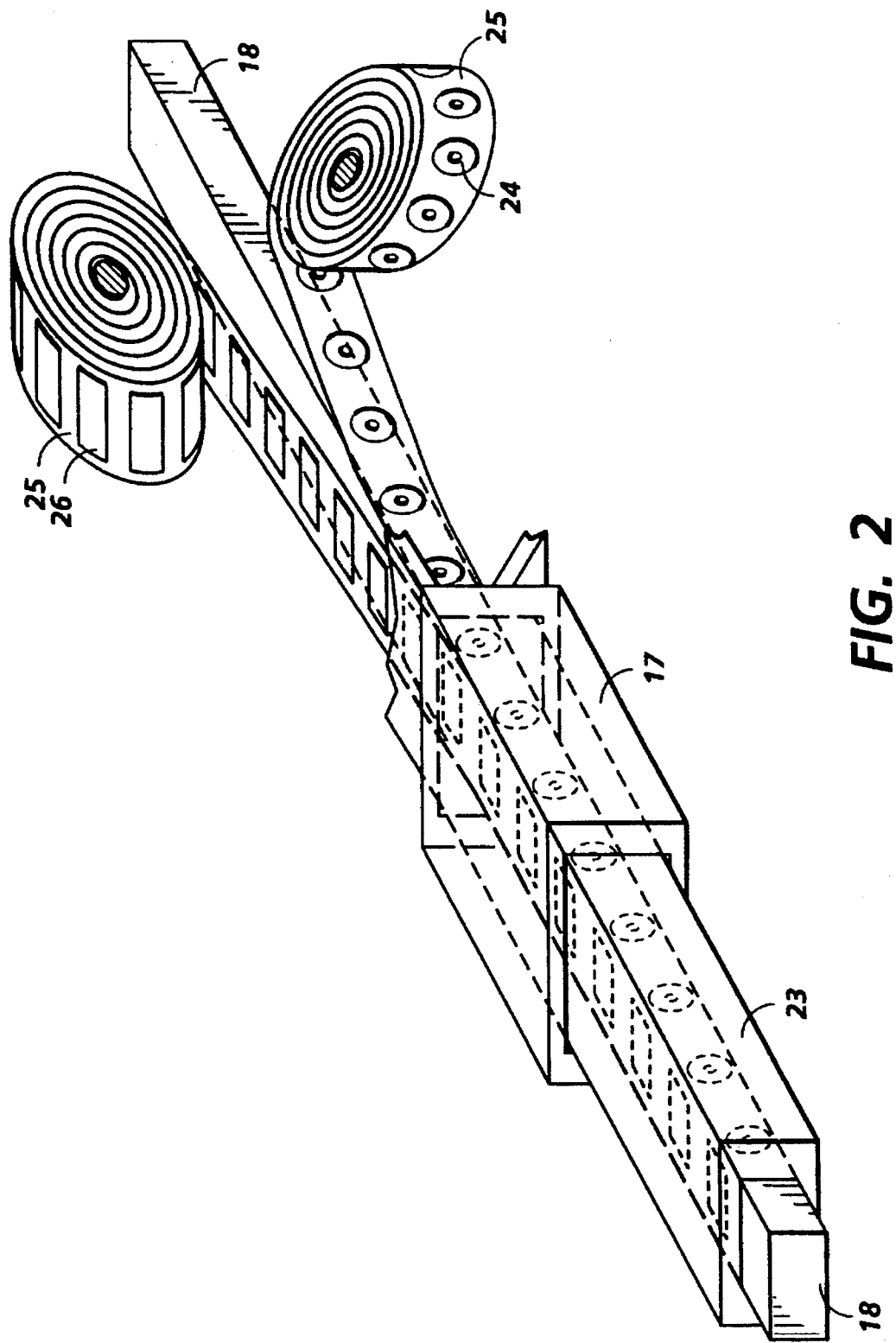
FIG. 2 is an enlarged isometric view of the die and mandrel in the pultrusion apparatus of FIG. 1 wherein one side of the pultrusion has the wall spacers present and another side has functional features present.

Turning now to FIGS. 1 and 2 the invention will be described in greater detail. In FIG. 1 the typical hollow pultrusion process is illustrated wherein continuous mat reinforcement 10 and roving 12 are first submerged in a liquid polymer baths 14 then formed through preforming dies 16 around a mandrel 18 which extends through the forming die section and through the heated die 17. The pulling section 19 is illustrated as a pair of continuous caterpillar type belts 20 containing pads 21 that engage the pultrusion 23. Referring now to FIG. 2 the carrier tapes 25 with the functional features such as hole inserts 24 and perhaps the spacers 26 according to the present invention is typically supplied to the mandrel surface after having been pulled through a liquid polymer bath 14 and accordingly, the carrier tapes with the functional features and any wall spacers and the reinforcing fibers are simultaneously pulled around the mandrel and into and through the heated die to shape and cure the liquid polymer into the tubular pultruded member. It will be understood that the apparatus and process generally illustrated in FIGS. 1 and 2 is one for creating a tubular pultrusion and that essentially the same apparatus and process may be used to form a solid pultrusion by adding additional fiber to the cross section and by eliminating the mandrel which extends through the forming die section and through the heated die in the illustrated apparatus. With particular reference to FIG. 2, it will be noted that in forming a tubular pultruded member, one carrier tape may contain spacers 26 to provide a uniform wall thickness while another carrier tape may contain functional features 24 such as hole inserts to add additional function to the pultruded member. In this regard it should also be noted that the hole inserts 24 may also be of the same thickness as the spacers 26 and thereby function as spacers. Holes can be located in a staggered pattern on any surface and/or adjacent features may share a common carrier-tape.

Figure 3A:
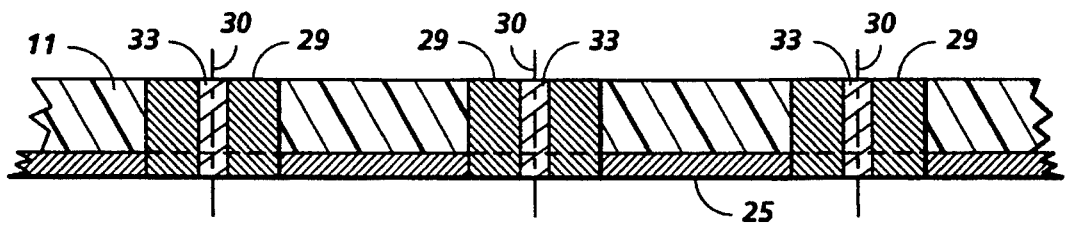
FIG. 3A is a cross sectional view of a pultruded member according to the present invention having threaded hole functional features with a removable plug in each hole insert. Each of the hole features as well as each of the plugs are provided on carrier tapes.
Figure 3B:
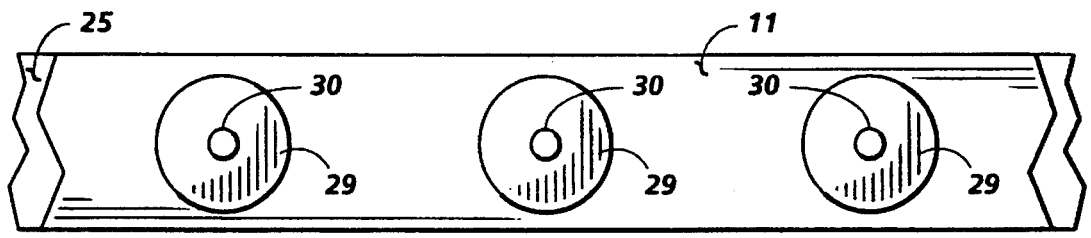
FIG. 3B is a top view of the pultruded member illustrated in FIG. 3A.
Figure 5:
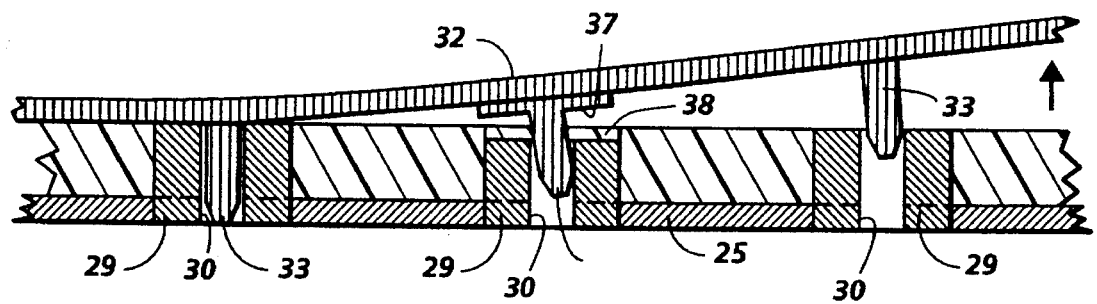
FIG. 5 is a cross sectional view of a pultruded member which has just been formed having a second carrier tape with plugs for the hole inserts and illustrating how the second tape and plugs may be readily removed.
Figure 6:
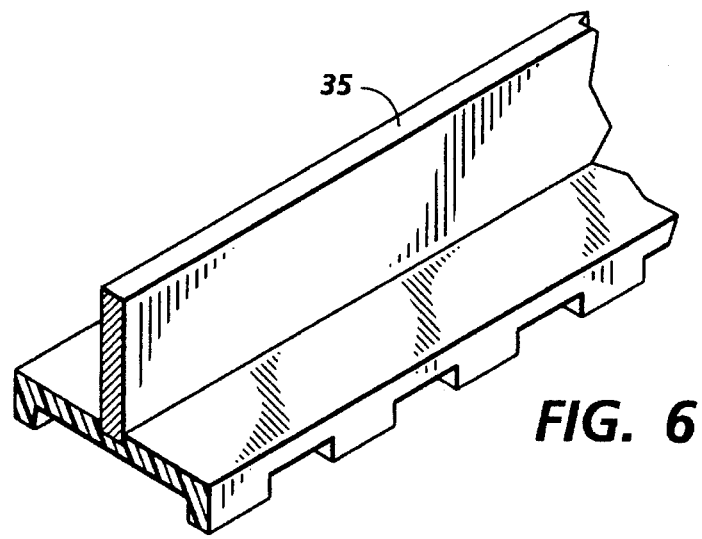
FIG. 6 is a cross sectional view of a pultruded member having a rib such as a metal rib member which may be continuous or discontinuous functional and or decorative embedded therein.
Figure 7:
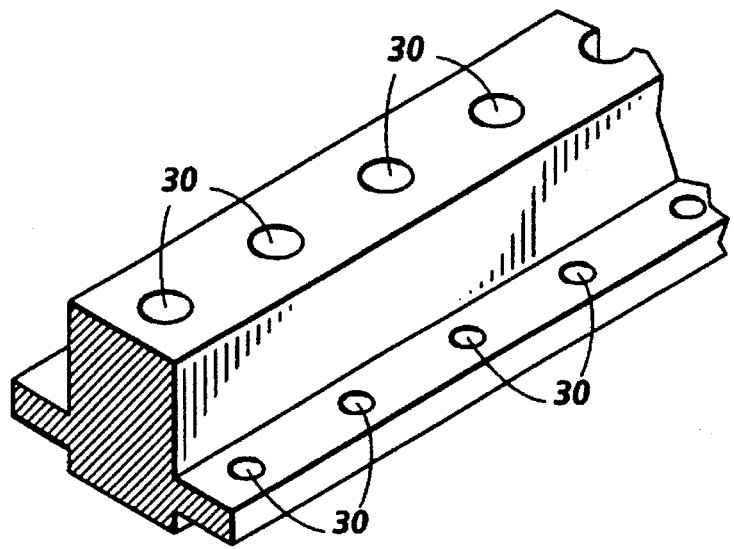
FIG. 7 is an isometric view of a solid pultruded member wherein functional features have been formed in both a flanged portion and a main body portion from two different carrier tapes being supplied to the fiber reinforced liquid polymer during the pultrusion process.

FIG. 3A illustrates a solid pultrusion wherein a plurality of desired hole inserts 29 are supplied to the liquid fiber reinforced polymer matrix during the pultrusion process to provide a series of desired hole features 30. The individual hole features may have plugs such as, for example, a readily removable silicone elastomer which may be readily removed upon completing the formation of the pultrusion. It is easier and less costly to remove a temporary plug of this nature than pultrusion resin that would otherwise fill the hole and cure in place. In addition, and as illustrated in the alternative embodiment of FIG. 5, a second carrier tape 32 may be provided with individual plugs 33 for the holes 30 in hole inserts 29 which are shaped to correspond to the hole fastener and positioned relative thereto and inserted in the individual hole while the first carrier tape with the functional features passes through the pultrusion process and may be readily remove therefrom by stripping the second carrier tape from the formed pultruded member when it exits the pultrusion apparatus. A suitable release agent may have to be applied to the surfaces 33 and/or 30 to facilitate removal of the plugs. Also illustrated in FIG. 5 is a feature 38 recessed below the surface of a hole insert 36 as well as extending into the polymer matrix. The temporary plug 33 includes a shoulder 37 to correspond to the recessed feature 38. Furthermore, as illustrated in FIG. 6, the functional features such as a metal rib 35, may extend outwardly to the surface or beyond the reinforced polymer portion of the pultruded member. Such a feature could provide a flat mounting surface, particularly for example, a mounting surface on a tubular pultrusion. Turning once again to FIGS. 3A and 3B, it will be noted that the functional hole features therein illustrated may also function as spacers in providing uniform wall thickness in a tubular member.

Figure 4A:
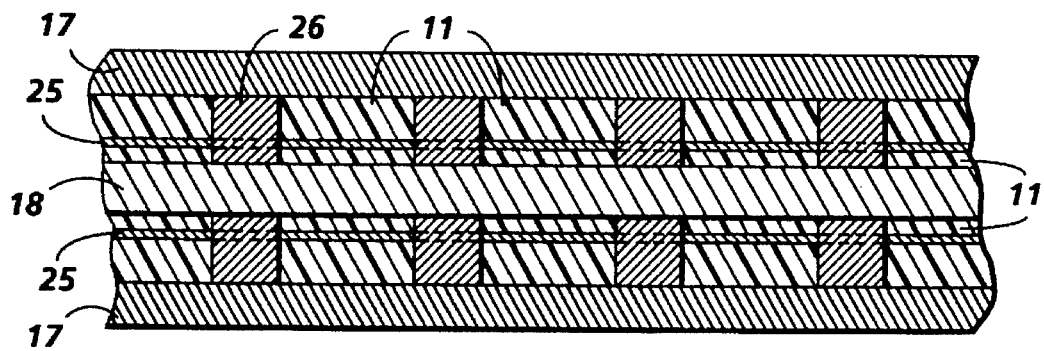
FIGS. 4A and 4B are cross sections of tubular pultruded members being formed in the pultrusion apparatus of FIG. 1 illustrating the position of the spacers relative to the mandrel and the heated die.
Figure 4B:
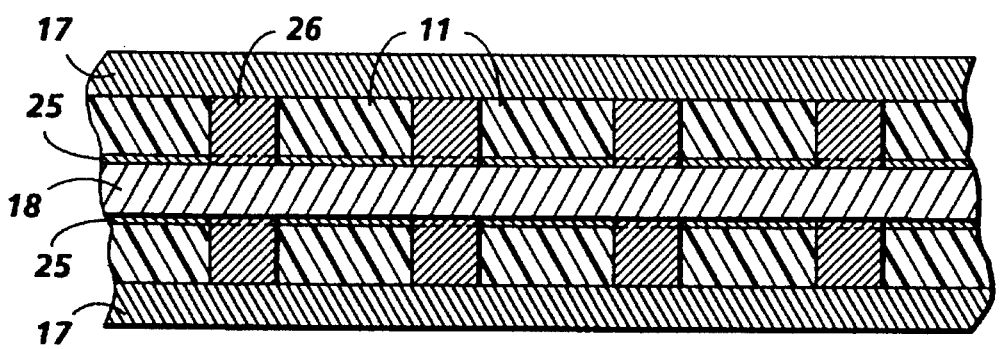

As illustrated in a cross section of FIGS. 4A and 4B, the spacers on the top and bottom of the tubular pultruded member have a thickness equal to the uniform distance between the outside of the mandrel and the inside surface of the die. FIG. 4A illustrates the embodiment wherein the spacers 26 extend through the tape 25 while FIG. 4B illustrates the spacers being in the surface of the carrier tape 25. The surfaces of the mandrel and die should be chosen from appropriately hard materials to resist abrasion and scratching which may arise from the sliding action of the solid spacers and/or functional feature against the die and mandrel surfaces. In FIGS. 4A and 4B the polymer matrix 11 includes any mat reinforcement 10 and roving 12 as shown in FIG. 1. As may be observed in FIG. 4A the polymer matrix 11 is between the inside of the heated die 17 and the carrier tape 25 and in FIG. 4B the polymer matrix 11 extends between the carrier tape 25 which is in contact with the mandrel 18 to the inside of the heated die 17.

Figure 8:
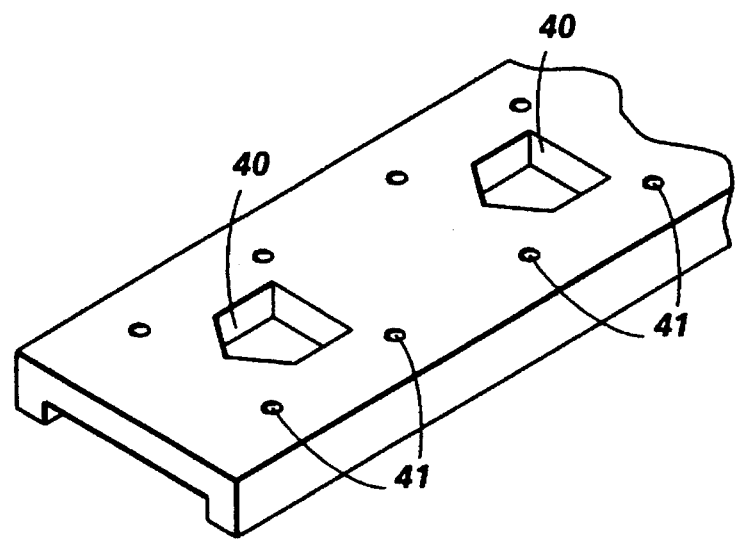
FIG. 8 is an isometric view of a typical ladder side rail.

FIG. 8 illustrates a practical embodiment wherein pultruded ladder side frames are fabricated complete with step and other mounting features 40, 41 provided by the pultrusion process of the present invention rather than the traditional secondary manufacturing operation.

The roving or tow, which is similar to a yarn, provides a continuous fiber reinforcement, which is aligned axially along the longitudinal axis of the tubular pultruded member. Typically, the rovings are fiberglass, but they may be of other fibers as well such as carbon, aromatic polyamide fibers such as Kevlar™ or any fiber that can be used as a reinforcing component. The mat reinforcement which may be woven or nonwoven provides fibers which are both axially and nonaxially oriented in a thin layer enhances transaxial mechanical properties as well as improves surface properties by way of enhancing abrasion resistance, weather resistance, etc. As with the rovings, the mat reinforcement may be selected from virtually any suitable fibrous material that is capable of withstanding the temperatures required in the pultrusion process. Typically, they are fiberglass, polyester, nylon, propylene, polyimide and the like. Typically the fiber loading including all rovings and mats is from about 50% to about 90% by weight of the total of the polymer matrix and fiber. In certain applications, the carrier tape with wall spacers according to the present invention may be used to replace the reinforcement mat or alternatively be in addition to it.

Any suitable polymer matrix may be employed in the practice of the present invention. The polymer may be insulating or conducting. If cross directional electrical connection is desired along the edges of the pultrusion a conducting polymer or conductive additives to the polymer may be used. Conversely, if insulating properties are desired along the edges of the pultrusion an insulating polymer may be used, or insulating fibers can be used in the outer periphery of the pultruded configuration and conducting fibers can be configured to reside away from the edges.

Typically, the polymer is selected from the group of structural thermoplastic and thermosetting resins. Polyesters, epoxies, vinyl esters, polyetheretherketones, polyetherimides, polyethersulphones, high density polyethylenes, polycarbonates, acrylonitrile-butadiene-styrene (ABS) polypropylene and nylon are in general, suitable materials with the thermosetting polyesters being preferred due to their short cure time, relative chemical inertness and low cost. If an elastomeric matrix is desired, a silicone, fluorosilicone or polyurethane elastomer may be chosen for the polymer matrix. Typical specific materials include Hetron 613, Arpol 7030 and 7362 available from Ashland Oil, Inc., Dion Iso 6315 available from Koppers Company, Inc. and Silmar S-7956 available from Vestron Corporation. For additional information on suitable resins attention is directed to Chapter 4 of the above-referenced Handbook by Meyer. Other materials may be added to the polymer bath to provide improved properties such as weather, corrosion or flame resistance as desired. In addition, the polymer bath may contain fillers such as calcium carbonate, alumina, silica or pigments to provide a certain color or lubricants to reduce friction, for example, in sliding members. Further additives to alter the viscosity, surface tension or to assist in bonding the pultrusion to the other materials may be added. Naturally, if the fiber has an organic sizing applied to it, a compatible polymer should be selected. For example, if an epoxy resin is being used, it would be appropriate to add an epoxy sizing to the fiber to promote adhesion.

The carrier tape with the functional features and any wall spacers may take various forms depending upon the cross section of the tubular pultruded member. To function properly, however, in providing the positioning of the functional features the tape and functional features as well as any wall spacers should be capable of withstanding the temperatures involved in the pultrusion process. The functional features and any spacers may be on the one surface of the carrier tape or alternatively extend through the tape. The carrier tape functional features and any spacers can be made of materials selected to provide desirable properties in the pultruded member and accordingly, may be selected for their conductivity or insulating properties. They may be selected of the same or different material but must be able to withstand the temperature (typically 250° to 300° F.) of the pultrusion process without degrading. Ideally, they are selected to be compatible with the polymers used and bond to the polymers otherwise the carrier tape functional features and any spacers will delaminate and not provide the desired structural reinforcing properties. Typically, polyesters such as Mylar™ and other high temperature plastic materials may be used to provide the carrier tape functional features and spacers. If insulating properties are desired a polyester carrier tape with polyester functional features and any wall spacers may be used. Alternatively, if electrically conductive properties are desired, thin metal foil such as aluminum or steel may be used. Metal carrier tapes can provide electrical connectivity for grounds and power and/or signal voltages. Finally, if desired, a solid pultrusion may be used as both the carrier tape and the functional feature. When using the carrier tape with functional features together with a mat reinforcement, it is preferable to provide a hole in the mat reinforcement to enable the functional features and any spacers to extend through it. To this end prepunched reinforcement mats may be used or if the functional feature or spacer is a very hard solid such as steel may allow the thickness of the mat to compress and poke itself through the mat. Alternatively, of course, a mat hole punching assembly may be placed ahead of the mat polymer bath.

Thus, according to the present invention, a pultruded composite member has been provided which has at least one functional feature embedded therein during it's manufacture when the fiber reinforced liquid polymer is pulled through a pultrusion apparatus. This enables one to provide holes, hole patterns, slots, ridges, grooves, inserts, threaded inserts and other shapes and features, which otherwise previously required a second operation involving increased time, labor and expense. By avoiding such a final machining operation to provide some of these features the difficulty in previously providing them in pultrusions is avoided in as much as fiberglass, a principle material used in both rovings and reinforcement mats in pultruded members, is difficult to machine or drill. Furthermore, according to the present invention, functional features which are perpendicular to the pultrusion process direction may be provided on both solid as well as tubular pultruded members. In addition to providing a pultruded member with functional features embedded therein the present invention may also provide wall spacers to tubular pultruded members wherein the wall thickness of the pultruded member may be controlled during it's manufacture. Furthermore, according to a specific aspect of the present invention a second carrier tape with plugs shaped and positioned to correspond to hole fastener inserts in a first carrier tape may be inserted in the first carrier tape and stripped therefrom when the pultruded member is removed from the heated die to eliminate the necessity of a second drilling operation to remove crosslinked polymer from the holes in the first carrier tape.

The disclosures of the cross referenced application and other references, including the Meyer book, referred to herein are hereby specifically and totally incorporated herein by reference.

While the invention has been described with reference to specific embodiments it will be apparent to those skilled in the art that many alternatives, modifications and variations may be made. Accordingly, it is intended to embrace all such alternatives and modifications as may fall within the spirit and scope of the appended claims.

We claim:

1. A tubular pultruded composite member having a longitudinal axis comprising a plurality of reinforcing fibers in a solid polymer matrix, said member having embedded in a surface thereof at least one functional feature having been incorporated therein during its manufacture when the fiber reinforced liquid polymer was pulled through a pultrusion apparatus, wherein said tubular pultruded composite member has embedded therein a series of wall spacers parallel to said longitudinal axis, said wall spacers having been used to control the wall thickness of said tubular pultruded member during its manufacture when the fiber reinforced liquid polymer was drawn over a mandrel and through a die.

2. The pultruded member of claim 1, wherein said functional feature is a mounting component.

3. The pultruded member of claim 2, wherein said mounting component is a threaded hole fastener insert.

4. The pultruded member of claim 1, wherein said functional feature also functions as a wall spacer.

5. The pultruded member of claim 1, wherein said reinforcing fibers are oriented in said matrix in a direction substantially parallel to said longitudinal axis.

6. The pultruded member of claim 1, wherein said at least one functional feature extends outwardly beyond the pultruded reinforced polymer portion of the pultruded member.

7. The pultruded member of claim 1, wherein said at least one functional feature is recessed below the surface of the member.

8. The pultruded member of claim 1, wherein there is a plurality of functional features embedded in the surface of the member.

9. The pultruded member of claim 8, wherein said plurality of functional features are on a carrier tape.

10. The pultruded member of claim 8, wherein said plurality of functional features extends through a carrier tape.

* * * * *